US010025615B2

(12) United States Patent
Tsirkin et al.

(10) Patent No.: US 10,025,615 B2
(45) Date of Patent: Jul. 17, 2018

(54) DYNAMIC GUEST VIRTUAL MACHINE IDENTIFIER ALLOCATION

(71) Applicant: Red Hat Israel, Ltd., Ra'anana (IL)

(72) Inventors: Michael Tsirkin, Westford, MA (US); Gal Hammer, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 15/489,398

(22) Filed: Apr. 17, 2017

(65) Prior Publication Data

US 2017/0249181 A1 Aug. 31, 2017

Related U.S. Application Data

(63) Continuation of application No. 14/629,945, filed on Feb. 24, 2015, now Pat. No. 9,626,221.

(51) Int. Cl.
| | |
|---|---|
| *G06F 12/00* | (2006.01) |
| *G06F 13/00* | (2006.01) |
| *G06F 9/455* | (2018.01) |
| *G06F 9/50* | (2006.01) |
| *G06F 9/445* | (2018.01) |
| *G06F 12/1036* | (2016.01) |
| *G06F 8/654* | (2018.01) |

(52) U.S. Cl.
CPC ......... *G06F 9/45558* (2013.01); *G06F 8/654* (2018.02); *G06F 8/665* (2013.01); *G06F 9/45545* (2013.01); *G06F 9/5016* (2013.01); *G06F 12/1036* (2013.01); *G06F 2009/45583* (2013.01); *G06F 2212/152* (2013.01)

(58) Field of Classification Search
CPC ................................................ G06F 2212/151

USPC ............................................................ 711/6
See application file for complete search history.

(56) References Cited

U.S. PATENT DOCUMENTS

| | | | |
|---|---|---|---|
| 5,317,710 A | 5/1994 | Ara et al. | |
| 7,356,665 B2 * | 4/2008 | Rawson, III | ......... G06F 1/3275 711/202 |

(Continued)

OTHER PUBLICATIONS

Yubin Xia, Yutao Liu, Haibo Chen, Architecture Support for Guest-Transparent VM Protection from Untrusted Hypervisor and Physical Attacks, 2013, 12 pages, Institute of Parallel and Distributed Systems, Shanghai Jiao Tong University, retrieved from http://ipads.se.sjtu.edu.cn/_media/publications/hypercoffer-hpca2013.pdf on Feb. 20, 2015.

(Continued)

*Primary Examiner* — Sean D Rossiter
(74) *Attorney, Agent, or Firm* — Haynes and Boone, LLP

(57) ABSTRACT

An example method of updating a virtual machine (VM) identifier (ID) stored in a memory buffer allocated from guest memory includes supplying firmware to a guest running on a VM that is executable on a host machine. The firmware includes instructions to allocate a memory buffer. The method also includes obtaining a buffer address of the memory buffer. The memory buffer is in guest memory and stores a VM ID that identifies a first instance of the VM. The method further includes storing the buffer address into hypervisor memory. The method also includes receiving an indication that the VM ID has been updated. The method further includes using the buffer address stored in hypervisor memory to update the VM ID.

20 Claims, 5 Drawing Sheets

(56) References Cited

U.S. PATENT DOCUMENTS

| | | |
|---|---|---|
| 7,409,487 B1 | 8/2008 | Chen et al. |
| 8,090,919 B2 | 1/2012 | Sahita et al. |
| 8,661,181 B2 | 2/2014 | Liljeberg |
| 8,683,047 B2 | 3/2014 | Han et al. |
| 8,788,739 B2 | 7/2014 | Chang et al. |
| 9,170,853 B2 | 10/2015 | Imamura |
| 2009/0327462 A1* | 12/2009 | Adams .................. G06F 9/5077 709/222 |
| 2012/0144391 A1 | 6/2012 | Ueda |
| 2013/0097360 A1* | 4/2013 | Brandt .................. G06F 9/4843 711/6 |
| 2013/0138834 A1* | 5/2013 | Imamura ............... G06F 9/5088 709/242 |
| 2013/0159650 A1* | 6/2013 | Wakamiya ............. G06F 3/065 711/162 |
| 2014/0047436 A1* | 2/2014 | Jayachandran ........... G06F 8/71 718/1 |
| 2016/0162302 A1* | 6/2016 | Warszawski ........ G06F 9/44505 713/2 |
| 2016/0246649 A1* | 8/2016 | Tsirkin .................... G06F 8/654 |
| 2016/0371496 A1* | 12/2016 | Sell ...................... G06F 9/45558 |
| 2017/0214617 A1* | 7/2017 | Bogdanski ............ H04L 45/586 |

OTHER PUBLICATIONS

SW/HW Extensions for Virtualized Heterogeneous Multicore Platforms, Jul. 2013, 29 pages, retrieved from http://www.virtical.eu/pub/D3.1.pdf_on Feb. 20, 2015.

H. Andres Lagar-Cavilla, Joseph A. Whitney, Adin Scannell, Philip Patchin, Stephen M. Rumble, Eyal De Lara, Michael Brudno, M. Satyanarayanan; SnowFlock: Rapid Virtual Machine Cloning for Cloud Computing , Apr. 1-3, 2009, 12 pages, University of Toronto and Carnegie Mellon University retrieved from http://www.cs.utoronto.ca/~brudno/snowflock_eurosys.pdf on Feb. 20, 2015.

* cited by examiner

DYNAMIC GUEST VIRTUAL MACHINE IDENTIFIER ALLOCATION

CROSS REFERENCE TO RELATED APPLICATION

This application is a continuation of U.S. patent application Ser. No. 14/629,945 filed Feb. 24, 2015, now U.S. Pat. No. 9,626,221 issued Apr. 18, 2017, which is incorporated in its entirety by reference herein.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). An OS is a set of programs that manages computer hardware resources and provides common services for application software. For hardware functions such as input and output and memory allocation, the OS typically acts as an intermediary between application programs and hardware. OSs may be found on a variety of devices, including desktop computers, servers, smartphones, video game consoles, and so forth.

A host machine (e.g., computer or server) is typically enabled to simultaneously run one or more VMs, where each VM may be used by a local or remote client. The host machine allocates a certain amount of the host's resources to each of the VMs. Each VM may use the allocated resources to execute applications, including an OS known as a guest OS or guest. The hypervisor virtualizes the underlying hardware of the host machine or emulates hardware devices, making the use of the VM transparent to the guest or the remote client that uses the VM. Typically, a hypervisor manages allocation and virtualization of computer resources and performs context switching, as may be necessary, to cycle between various VMs.

The Advanced Configuration and Power Interface (ACPI) specification provides an open standard for device configuration and power management by the OS. The ACPI specification defines four global "Gx" states G0 through G3, six sleep "Sx" states S0 through S5, four device states D0 through D3, four processor states C0 through C3, and up to 17 implementation-dependent power-performance states P0 through Pn, where n is an integer between 1 and 16 inclusive. In addition, ACPI defines several tables that provide an interface between an ACPI-compliant OS and system firmware, including a Differentiated System Description Table (DSDT), a Secondary System Description Table (SSDT), and a System Resource Affinity Table (SRAT).

BRIEF SUMMARY

The present disclosure provides techniques to update virtual machine (VM) identifiers (IDs) using non-fixed memory addresses. Methods, systems, and techniques for updating a VM ID stored in a memory buffer are provided.

According to an embodiment, a method of updating a VM ID stored in a memory buffer allocated from guest memory includes supplying firmware to a guest running on a VM that is executable on a host machine. The firmware includes instructions to allocate a memory buffer from guest memory. The method also includes obtaining a buffer address of the memory buffer allocated from guest memory. The memory buffer stores a VM ID that identifies a first instance of the VM. The method further includes storing the buffer address into hypervisor memory. The method also includes receiving an indication that the VM ID has been updated. The method further includes using the buffer address stored in hypervisor memory to update the VM ID.

According to another embodiment, a system for updating a VM ID stored in a memory buffer allocated from guest memory includes a hypervisor that supplies firmware to a guest running on a VM that is executable on a host machine, obtains a buffer address of the memory buffer allocated from guest memory, and stores the buffer address into hypervisor memory. The firmware includes instructions to allocate the memory buffer from guest memory, and the memory buffer stores a VM ID that identifies a first instance of the VM. In response to receiving an indication that the VM ID has been updated, the hypervisor uses the buffer address stored in the hypervisor memory to update the VM ID.

According to another embodiment, a non-transitory machine-readable medium includes a plurality of machine-readable instructions that when executed by one or more processors are adapted to cause the one or more processors to perform a method including: supplying, by a hypervisor, firmware to a guest running on a VM that is executable on a host machine, where the firmware includes instructions to allocate a memory buffer from guest memory; obtaining a buffer address of the memory buffer allocated from guest memory, where the memory buffer stores a VM ID that identifies a first instance of the VM; storing the buffer address into hypervisor memory; receiving an indication that the VM ID has been updated; and using the buffer address stored in hypervisor memory to update the VM ID.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Example Process Flows
   A. Store Buffer Address of a Memory Buffer Allocated from Guest Memory into Hypervisor Memory 1. VM ID is Stored in Memory Buffer
2. ACPI Data Structure is Used to Pass the Buffer Address to Hypervisor
3. Hypervisor Stores Buffer Address into Hypervisor Memory
B. Update the VM ID Stored at the Buffer Address
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to give more flexibility in allocating memory areas in a virtualization environment. A virtual machine (VM) identifier (ID) is a unique ID that uniquely identifies a particular instance of a VM. A guest may detect events such as a VM restore from a snapshot based on the VM ID. It may be undesirable to store the VM ID at a fixed memory address. For example, storing VM IDs at fixed memory addresses may lead to maintenance problems because a fixed layout may conflict with real hardware addresses used by emulated hardware. Additionally, the present disclosure provides more flexibility for guests to allocate cacheable addresses.

In an embodiment, a method of updating a virtual machine (VM) identifier (ID) stored in a memory buffer allocated from guest memory includes supplying firmware to a guest running on a VM that is executable on a host machine. The firmware includes instructions to allocate a memory buffer from guest memory. The method also includes obtaining a buffer address of the memory buffer allocated from guest memory. The memory buffer stores a first VM ID that identifies a first instance of the VM. The method further includes storing the buffer address into hypervisor memory. The method also includes receiving an indication that the first VM ID has been updated. The method further includes using the buffer address stored in hypervisor memory to update the first VM ID.

II. Example System Architecture

Figure 1:
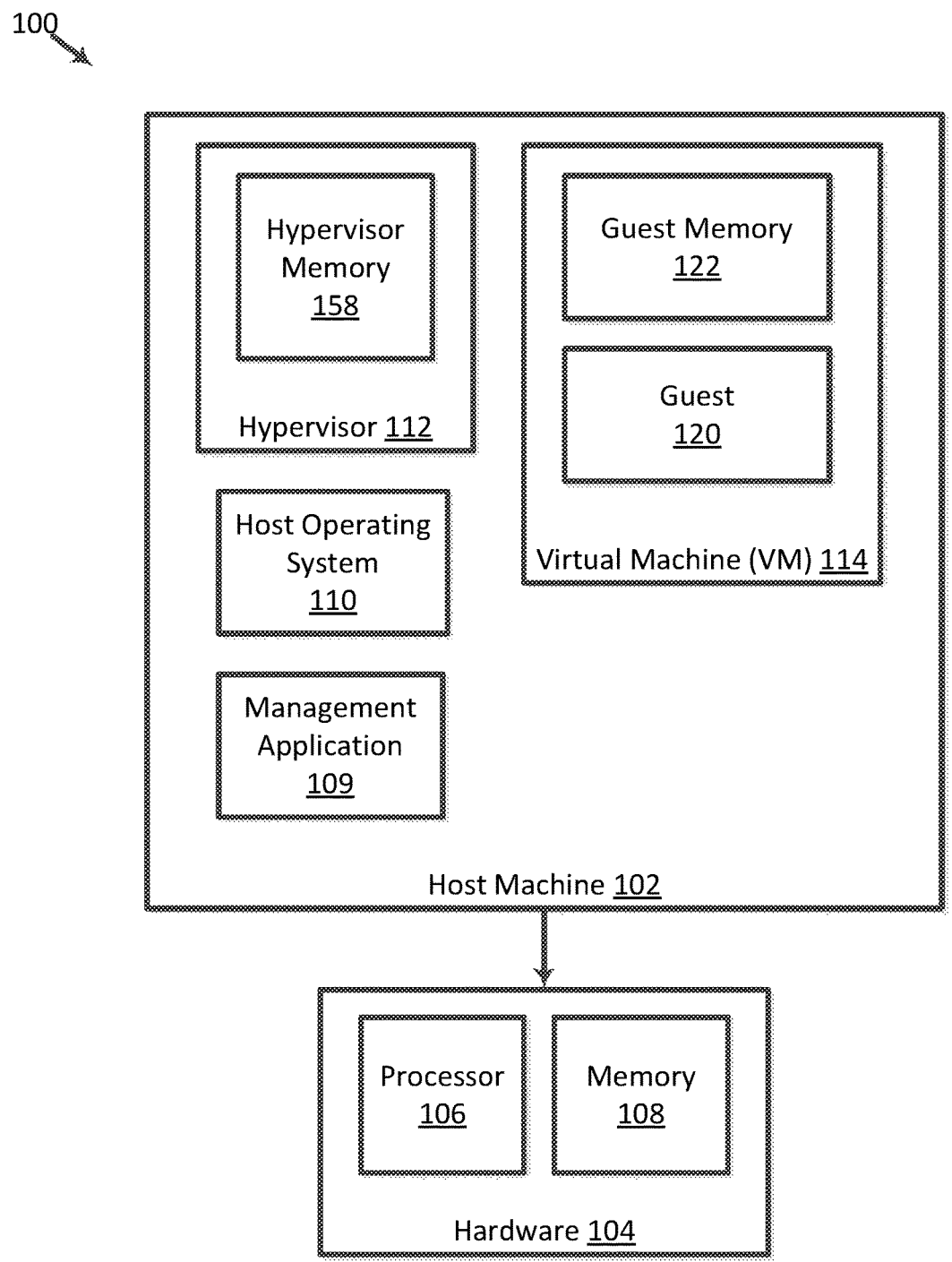
FIG. 1 is a block diagram illustrating a system for updating a virtual machine (VM) identifier (ID) stored in a memory buffer allocated from guest memory, according to some embodiments.

FIG. 1 is a block diagram illustrating a system 100 for updating a VM ID stored in a memory buffer allocated from guest memory, according to some embodiments. System 100 includes a host machine 102 coupled to hardware 104. Hardware 104 includes a processor 106 and a memory 108, and may include other I/O devices. Host machine 102 may host one or more VMs that run applications and services.

In FIG. 1, host machine 102 includes a host operating system (OS) 110, hypervisor 112, and VM 114. Each of host OS 112, hypervisor 112, and VM 114 is executable on a computing device having at least one processor and memory. VM 114 includes a guest 120. Although one VM and one hypervisor are illustrated is host machine 102, other embodiments including more than one VM and/or more than one hypervisor executable on host machine 102 are within the scope of the present disclosure. For example, hypervisor 112 may allow multiple OSs, called guests or guest OSs, to run on the same physical system by offering virtualized hardware to the guests. The host machine may run multiple OSs, concurrently and in isolation from other programs on a single system. A guest may run a different OS than another guest executing on the same host machine. Additionally, the guest running on a VM may also be different from the host OS running on host machine 102. The host OS or guest may include, for example, MICROSOFT® WINDOWS®, LINUX®, SOLARIS®, and MAC® OSs. Trademarks are the property of their respective owners.

One or more guests and application stacks may be run on top of hypervisor 112. In the example illustrated in FIG. 1, VM 114 is the platform (e.g., virtual hardware) on which guest 120 runs. Hypervisor 112 owns the real system resources and makes them available to one or more guests that alternately execute on the same hardware. Hypervisor 112 includes a hypervisor memory 158, which may include memory locations that map to physical memory locations in memory 108.

Hypervisor 112 manages hardware resources and arbitrates requests from one or more guests and application stacks. In an example, hypervisor 112 presents a virtual set of CPU, memory, I/O, and disk resources to each guest either based on the actual physical hardware or based on a standard and consistent selection of custom hardware. A VM has its own address space in memory, its own processor resource allocation, and its own device input/output (I/O) using its own virtual device drivers. Hypervisor 112 may map a virtual resource or state (e.g., registers, memory, or files) to real resources in the underlying machine. For example, hypervisor 112 may present a guest memory 122 to guest 120, and memory locations of guest memory 122 may be mapped to physical memory locations in memory 108.

Host machine 102 includes a management application 109 that communicates with hypervisor 112. Management application 109 may send requests to start up VMs associated with VM IDs to hypervisor 112.

III. Example Process Flows

Figure 2:
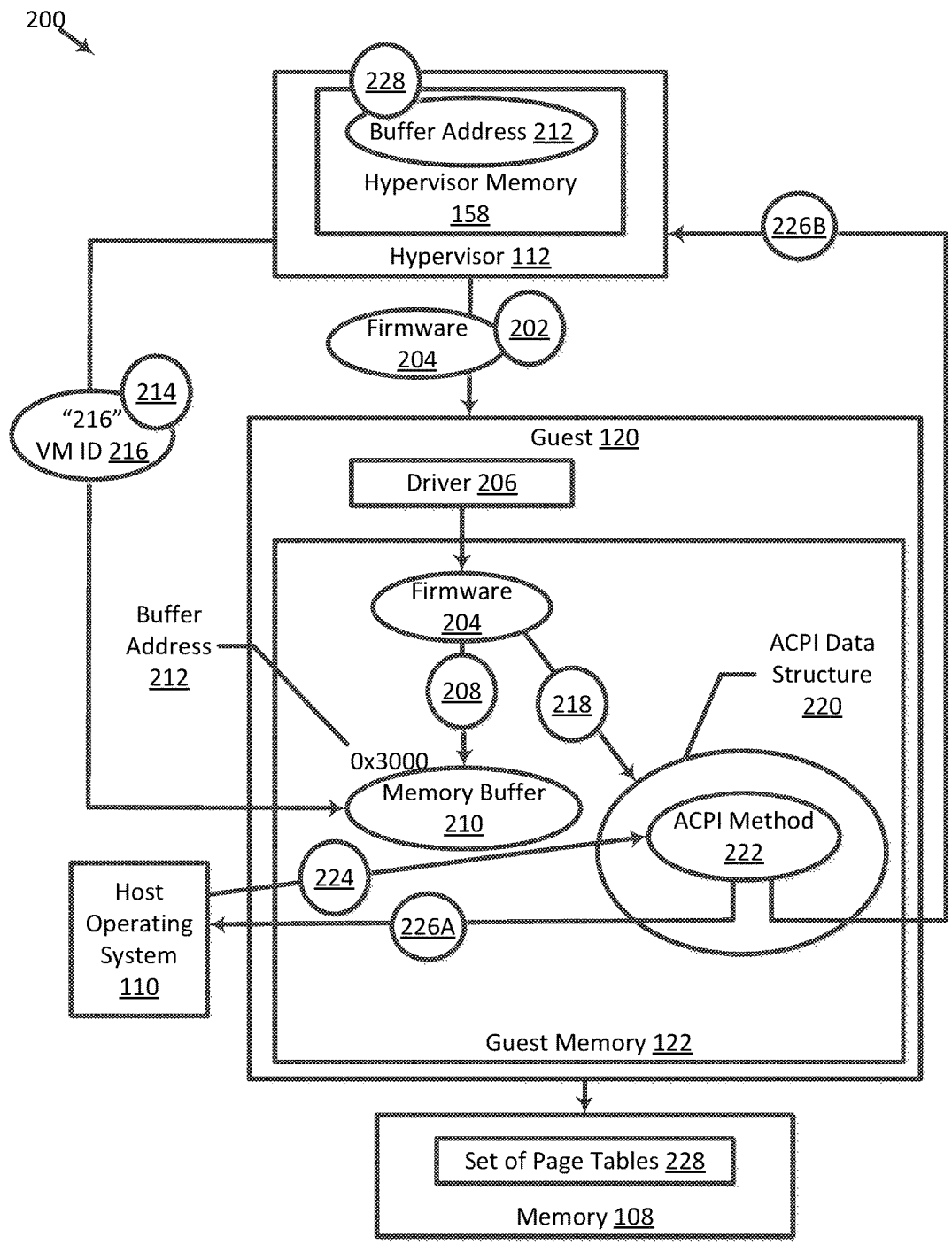
FIG. 2 is a process flow of storing a buffer address at which a VM ID is stored into hypervisor memory, according to some embodiments.

FIG. 2 is a process flow 200 of storing a buffer address at which a VM ID is stored into hypervisor memory, according to some embodiments. Guest 120 may start up. At an action 202, hypervisor 112 supplies firmware 204 to guest 120 running on VM 114, and guest 120 loads firmware 204 from hypervisor 112.
A. Store Buffer Address of a Memory Buffer Allocated from Guest Memory into Hypervisor Memory
1. VM ID is Stored in Memory Buffer Guest 120 includes a driver 206 that executes firmware 204 within the guest. In some embodiments, firmware 204 includes instructions to allocate memory from guest memory 122 and generate data structures such as Advanced Configuration and Power Interface (ACPI) data structures. ACPI is a specification that defines platform-independent interfaces for hardware discovery, configuration, power management, and monitoring. The specification is central to OS-directed configuration and power management (OSPM). The OSPM component is an interpreter that executes the byte code within the ACPI data structure. The OSPM component may be incorporated into host OS 110 or may be external to and interact with host OS 110. The ACPI specification describes the interfaces between components, the contents of the ACPI System Description Tables, and the related semantics of the other ACPI components. ACPI may include one or more ACPI tables that describe aspects of the system hardware and its preferred capabilities to an ACPI-aware OS.

At an action 208, a memory buffer 210 is allocated from guest memory 122. By executing firmware 204, guest 120 may allocate memory buffer 210. Memory buffer 210 is in guest memory 122. In an example, firmware 204 includes instructions to allocate memory buffer 210. In such an example, in response to driver 206 executing firmware 204, memory buffer 210 may be allocated. In another example, driver 206 includes instructions to allocate memory buffer 210. In such an example, driver 206 may allocate memory buffer 210. In FIG. 2, memory buffer 210 is located at a buffer address 212, which is "0x3000." Buffer address 212 is a virtual memory address that maps to a physical memory address in memory 108.

At an action 214, hypervisor 112 obtains a VM ID 216 "216" and stores it in memory buffer 210. A VM ID is a unique ID that uniquely identifies a particular instance of a VM. Different instances or snapshots of the same VM may have different VM IDs. Hypervisor 112 may generate the VM ID or obtain it from another component that generates the VM ID. Although hypervisor 112 is described as storing the VM ID into memory buffer 210, this is not intended to be limiting and another component may store the VM ID into memory buffer 210. In an example, firmware 204 may include instructions to store the VM ID into memory buffer 210. In such an example, firmware 204 may prepopulate memory buffer 210 with the VM ID.

Memory buffer 210 is dynamically allocated and is located at a non-fixed memory address. In particular, buffer address 212 is a dynamically allocated address that is not fixed. For example, the memory address at which the VM ID is stored may be different each time VM 114 starts up. Accordingly, different memory addresses may be used to store VM IDs, and thus the problem of fixed memory addresses that store VM IDs conflicting with real hardware addresses used by emulated hardware may be avoided. The buffer address at which the VM ID is stored is not within a fixed set of memory addresses allocated specifically for storing VM IDs. Rather, the buffer address may be dynamically determined and allocated.

2. ACPI Data Structure is Used to Pass the Buffer Address to Hypervisor

At an action 218, firmware 204 generates one or more ACPI data structures 220 with an ACPI method 222 that causes buffer address 212 to be passed to another component (e.g., host OS 112 or hypervisor 112). ACPI data structure 220 may be an ACPI table that includes ACPI method 222.

At an action 224, host OS 110 invokes ACPI method 222, which returns buffer address 212 of memory buffer 210 to a component. At an action 226A, in response to the invocation of ACPI method 222, guest 120 passes buffer address 212 "0x3000" to host OS 110. At an action 226B, in response to the invocation of ACPI method 222, guest 120 passes buffer address 212 "0x3000" to hypervisor 112. In some examples, guest 120 passes buffer address 212 "0x3000" to host OS 110, and host OS 110 passes the buffer address to hypervisor 112. Accordingly, hypervisor 112 and host OS 110 both know at which memory address VM ID 216 "216" is stored. Hypervisor 112 may use buffer address 212 to communicate the VM ID to host OS 110, which may use buffer address 212 to determine whether the VM ID has changed.

In some examples, ACPI data structure 220 includes a device including ACPI method 222. The device may be a synthetic device that does not describe any hardware and that may be given a user-readable name. In an example, the synthetic device includes ACPI method 222, which may be written in a special byte code to interpret the language and called by an automated system. In this example, to invoke ACPI method 222, host OS 110 may search for the synthetic device rather than searching for ACPI method 222 directly. ACPI method 222 includes code that may be executed when the synthetic device is initialized, or when ACPI method 222 is evaluated. In some examples, driver 206 allocates memory buffer 210 when driver 206 initiates the device.

Guest 120 may pass buffer address 212 to host OS 110 and/or hypervisor 112 in a variety of ways. In an example, guest 120 passes buffer address 212 to hypervisor 112 by writing buffer address 212 to a non-present address in memory 108. In FIG. 2, memory 108 includes a set of page tables 228 used by a virtual memory system in host OS 112 to store the mappings between virtual addresses and physical addresses. In an example, a first portion of set of pages tables 228 resides in random access memory (RAM), and a second portion of set of pages tables 228 does not reside RAM (e.g., resides in a swap device). If buffer address 212 is written to a non-present address (e.g., the second portion of set of page tables 228), the non-present address is marked as non-present in set of page tables 228 and results in an access violation and a trap into hypervisor 112 or some kind of page fault, depending on the architecture of processor 106. Hypervisor 112 may retrieve the data stored in the non-present address and determine that the retrieved data is buffer address 212 of memory buffer 210.

In another example, guest 120 invokes a hypercall instruction that traps into hypervisor 112. In such an example, guest 120 may execute a privileged instruction that traps into hypervisor 112, and hypervisor 112 may decode the executed instruction and determine that guest 120 has passed buffer address 212 of memory buffer 210 to hypervisor 112.

3. Hypervisor Stores Buffer Address into Hypervisor Memory

At an action 228, hypervisor 112 obtains buffer address 212 of memory buffer 210 allocated from guest memory 122, and stores buffer address 212 into hypervisor memory 158. Accordingly, hypervisor 112 knows where VM ID 216 "216," which identifies an instance of VM 114, is stored in guest memory 122.

B. Update the VM ID Stored at the Buffer Address

Figure 3:
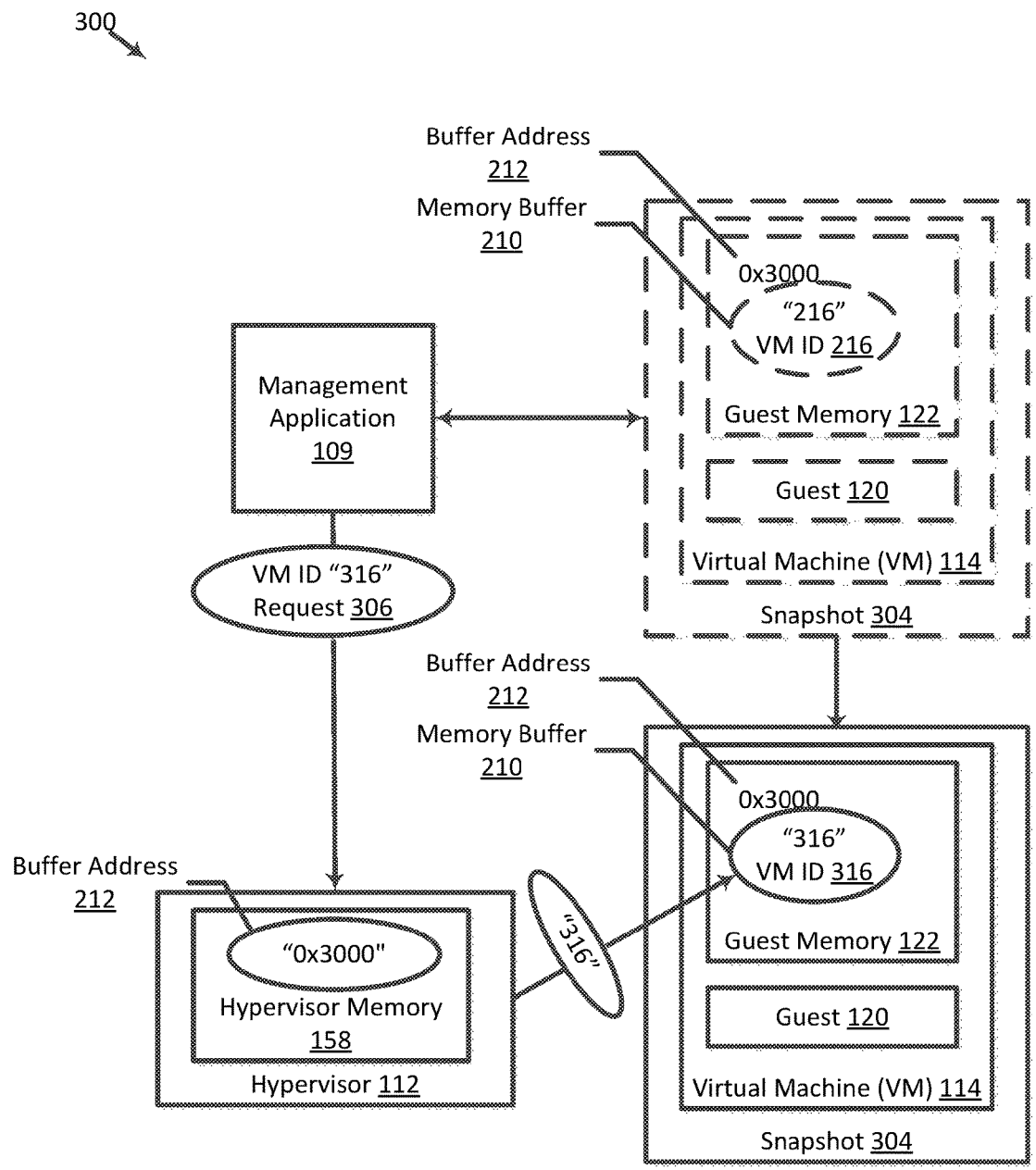
FIG. 3 is a process flow of updating a VM ID stored in a memory buffer allocated from guest memory, according to some embodiments.

FIG. 3 is a process flow 300 of updating VM ID 216 "216" stored in memory buffer 210, according to some embodiments. In FIG. 3, management application 109 may detect an event that causes a VM ID of a VM to change. A VM ID that identifies a particular instance of a VM may change, for example, if the VM starts to execute a snapshot of the VM, if the VM is recovered from a backup, if the VM is failed over in a disaster recovery environment, or if the VM is imported, copied, or cloned.

In the example illustrated in FIG. 3, a snapshot 304 of VM 114 is taken, and VM ID 216 "216" identifies the instance of VM 114 associated with snapshot 304. Snapshot 304 may be the parent snapshot of VM 114, and is the snapshot on which the current state is based. Snapshot 304 may preserve VM 114's settings, power state, disk state, and/or memory state at a point in time. VM 114 may be placed in snapshot mode prior to a software upgrade, OS update, or any VM configuration change. If the upgrade, update, or other change fails or otherwise is found unsuitable, then VM 114 may be quickly and easily returned to its previous state.

Management application 109 may detect an event that causes VM ID 216 "216" to change. In an example, after snapshot 304 has been taken, VM 114 may crash and be restored from snapshot 304. The current disk and memory states of VM 114 are discarded, and VM 114 reverts to the disk and memory states of snapshot 304. In such an example, management application 109 may detect that VM 114 is being restored from snapshot 304 and thus, VM ID 216 "216" will change. In response to detecting an event that causes VM ID 216 "216" associated with VM 114 to change, management application 109 may send hypervisor 112 a request 306 to update the VM ID associated with snapshot 304 of VM 114. Request 306 may include a request to update the VM ID that uniquely identifies an instance of VM 114 with an updated VM ID 316 "316" that uniquely identifies another instance of VM 114.

Hypervisor 112 receives request 306, which may be an indication to hypervisor 112 that VM ID 216 "216" is to be updated with VM ID 316 "316." As illustrated in FIG. 3, VM ID 216 "216" is stored at buffer address 212 "0x3000" in guest memory 122. Hypervisor 112 may obtain the buffer address at which the VM ID that uniquely identifies snapshot 304 of VM 114 is stored, and replace the VM ID stored at this buffer address with the updated VM ID 316 "316." As discussed, hypervisor 112 obtained and stored buffer address 212 "0x3000" into hypervisor memory 158. In this example, "0x3000" is the memory location that hypervisor 112 recognizes as storing VM ID 216 "216," which uniquely identifies snapshot 304 of VM 114. Accordingly, hypervisor 112 knows at which address in guest memory 122 to store the updated VM ID (e.g., VM ID 316 "316").

Hypervisor 112 uses buffer address 212 stored in hypervisor memory 158 to identify the location at which VM ID 216 "216" and to update the VM ID. If hypervisor 112 desires to update VM ID 216 "216," hypervisor 112 may use buffer address 212 stored in hypervisor memory 158 to do so. VM ID 216 "216" identifies a first instance of VM 114. In an example, hypervisor 112 retrieves buffer address 212 "0x3000" from hypervisor memory 158 and stores VM ID 316 "316" into buffer address 212. VM ID 316 "316" identifies a second instance of VM 114 and is stored in memory address "0x3000," which is located within guest memory 122.

VM 114 does not start from scratch but will read buffer address 212. In an example, guest 120 detects that VM 114 was restored from snapshot 304 by reading from buffer address 212 and determining that VM ID 216 "216" has been updated to VM ID 316 "316."

Management application 109 may detect that VM 114 has been migrated to a target host machine. In an example, hypervisor 112 may send VM ID 216 "216" to the target host machine, and the target host machine may update VM ID 216 "216" to a different VM ID. In another example, migration of VM 114 does not change VM ID 216.

As discussed above and further emphasized here, FIGS. 1-3 are merely examples, which should not unduly limit the scope of the claims. For example, host machine 102 may include a first snapshot and a second snapshot of VM 114. In another example, host machine 102 includes the first snapshot of VM 114, and a second host machine includes the second snapshot of VM 114. Additionally, although the embodiment of FIG. 2 includes ACPI firmware, other illustrative embodiments may include other virtualized hardware interface firmware (e.g., the Extensible Firmware Interface (EFI) by Intel®). It should be understood that all such virtualized hardware interface firmware is within the scope of the present disclosure.

IV. Example Method

Figure 4:
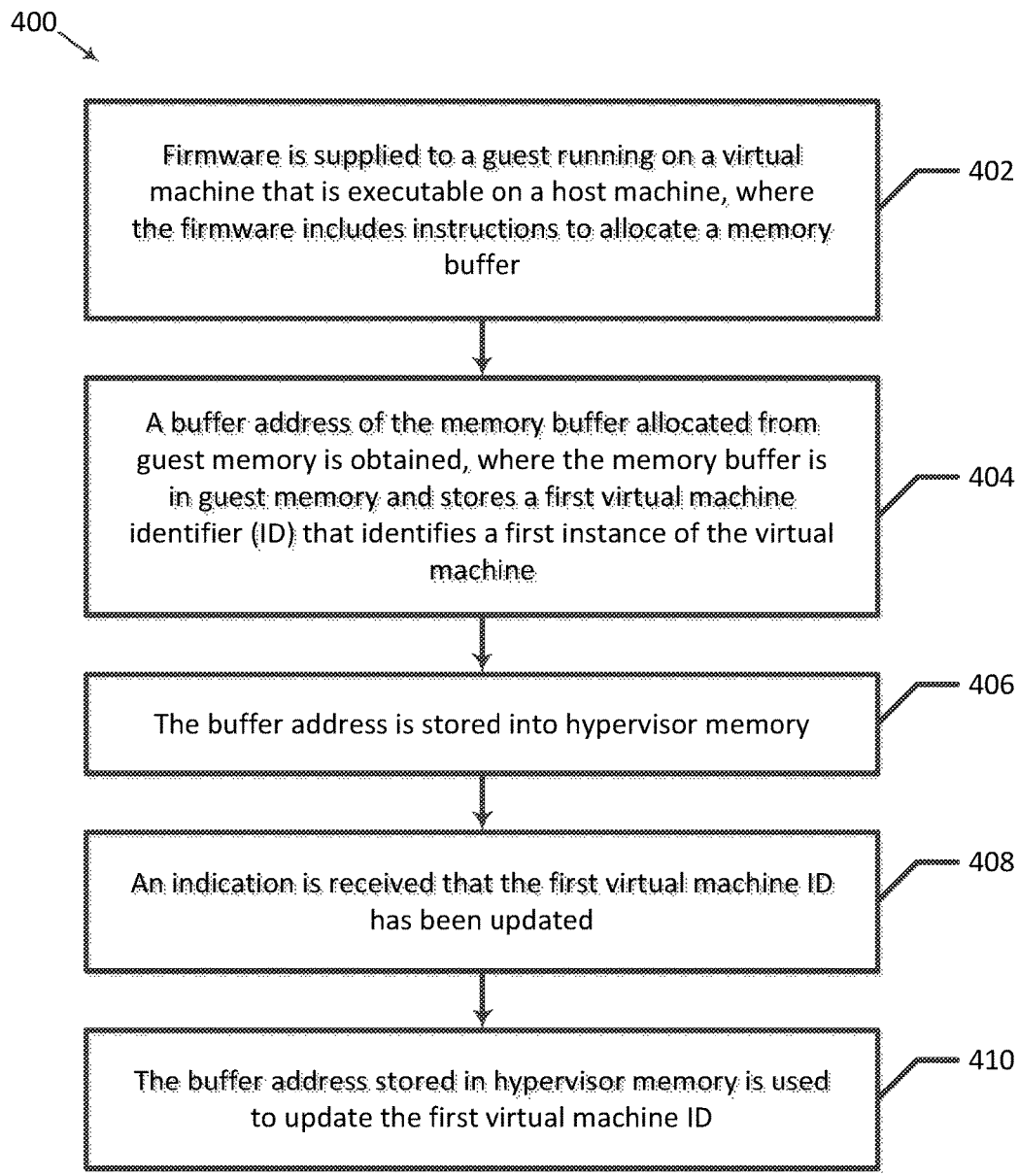
FIG. 4 is a flowchart illustrating a method of updating a VM ID stored in a memory buffer allocated from guest memory, according to some embodiments.

FIG. 4 is a flowchart illustrating a method 400 of updating a VM ID stored in a memory buffer allocated from guest memory, according to some embodiments. Method 400 is not meant to be limiting and may be used in other applications In FIG. 4, method 400 includes blocks 402-410. In a block 402, firmware is supplied to a guest running on a VM that is executable on a host machine, where the firmware includes instructions to allocate a memory buffer. In an example, hypervisor 112 supplies firmware 204 to guest 120 running on VM 114 that is executable on host machine 102, where firmware 204 includes instructions to allocate memory buffer 210. Guest 120 may execute firmware 204, thereby allocating memory buffer 210 from guest memory 122. In a block 404, a buffer address of the memory buffer allocated from guest memory is obtained, where the memory buffer is in guest memory and stores a first VM ID that identifies a first instance of the VM. In an example, hypervisor 112 obtains buffer address 212 of memory buffer 210 allocated from guest memory 122, where memory buffer 210 is in guest memory 122 and stores VM ID 216 "216" that identifies a first instance of VM 114.

In a block 406, the buffer address is stored into hypervisor memory. In an example, hypervisor 112 stores buffer address 212 into hypervisor memory 158. In a block 408, an indication that the first VM ID has been updated is received. In an example, hypervisor 112 receives an indication that VM ID 216 "216" has been updated. In a block 410, the buffer address stored in hypervisor memory is used to update the first VM ID. In an example, hypervisor 112 uses buffer address 212 stored in hypervisor memory 158 to update VM ID 216 "216."

Figure 5:
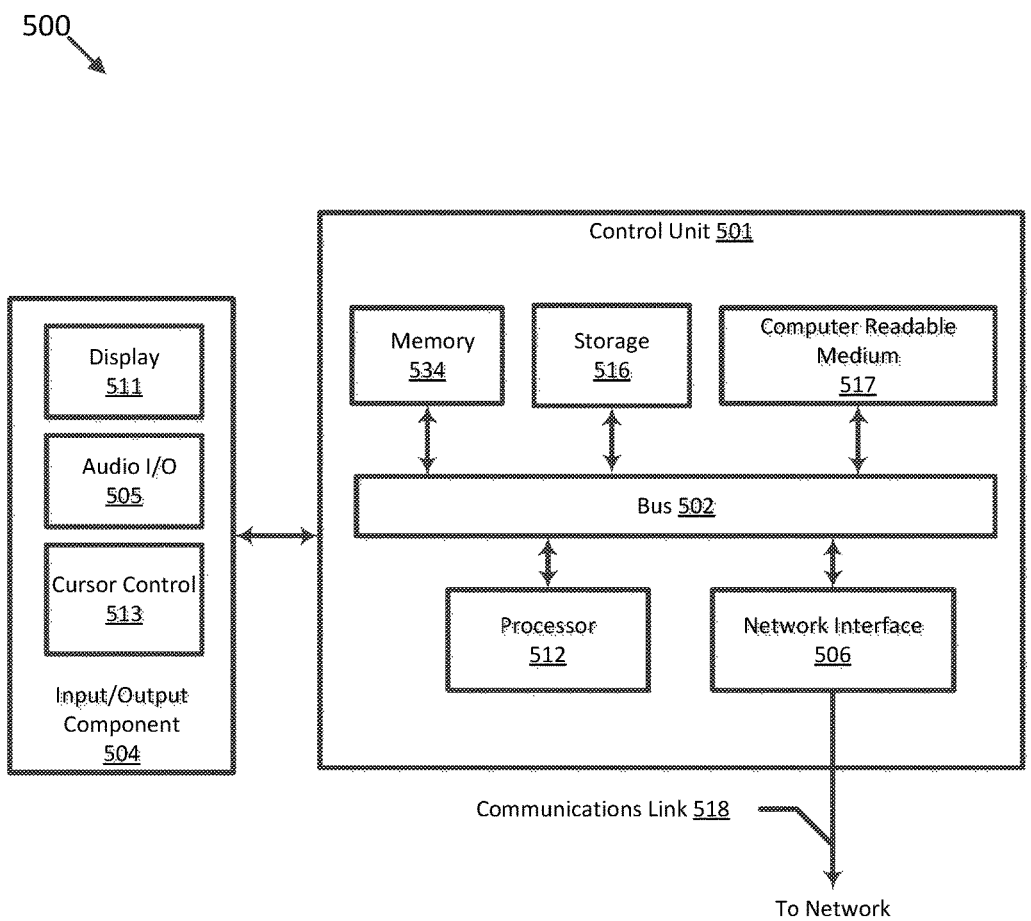
FIG. 5 is a block diagram of an electronic system suitable for implementing one or more embodiments of the present disclosure.

In some embodiments, one or more actions illustrated in blocks 402-410 may be performed for any number of instances of one or more VMs executing in one or more host machines. It is also understood that additional processes may be performed before, during, or after steps 402-410 discussed above. It is also understood that one or more of the steps of method 400 described herein may be omitted, combined, or performed in a different sequence as desired V. Example Computing System FIG. 5 is a block diagram of an example computer system 500 suitable for implementing any of the embodiments disclosed herein. In various implementations, each of management application 109, host OS 110, hypervisor 112, VM 114, and guest 120 may be implemented on computer system 500. The computer system 500 may include one or more processors 512. The computer system 500 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/ output (I/O) component 504 for processing user actions, such as selecting keys from a keypad/keyboard or selecting one or more buttons or links, etc., and sending a corresponding signal to bus 502. I/O component 504 may also include an output component such as a display 511, and an input control such as a cursor control 513 (such as a keyboard, keypad, mouse, etc.).

An audio I/O component 505 may also be included to allow a user to use voice for inputting information by converting audio signals into information signals. Audio I/O component 505 may allow the user to hear audio. A transceiver or network interface 506 transmits and receives signals between computer system 500 and other devices via a communications link 518 to a network. In an embodiment, the transmission is wireless, although other transmission mediums and methods may also be suitable.

A processor 512, which may be a micro-controller, digital signal processor (DSP), or other processing component, processes these various signals, such as for display on display 511 of computer system 500 or transmission to other devices via communication link 518. A processor may also control transmission of information, such as cookies or IP addresses, to other devices.

Components of computer system 500 also include a system memory component 534 (e.g., RAM), a static storage component 516 (e.g., ROM), and/or a computer readable medium 517. Computer system 500 performs specific operations by one or more processors 512 and other components by executing one or more sequences of instructions contained in system memory component 534. Logic may be encoded in computer readable medium 517, which may refer to any medium that participates in providing instructions to one or more processors 512 for execution. Such a medium may take many forms, including but not limited to, non-volatile media, volatile media, and transmission media.

In various implementations, non-volatile media include optical, or magnetic disks, or solid-state drives, volatile media include dynamic memory, such as system memory component 534, and transmission media include coaxial cables, copper wire, and fiber optics, including wires that include bus 502. In an embodiment, the logic is encoded in non-transitory computer readable medium. Computer readable medium 517 may be any apparatus that can contain, store, communicate, propagate, or transport instructions that are used by or in connection with processor 512. Computer readable medium 517 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 400) to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method, comprising:
receiving, by a guest running on a virtual machine that is executable on a host machine, firmware including instructions to allocate a memory buffer;
allocating, by the guest, the memory buffer from guest memory, wherein the memory buffer is located at a buffer address in guest memory and stores a first virtual machine identifier (ID) that identifies a first instance of the virtual machine;
transmitting the buffer address to the hypervisor; and
reading, by the guest, a second virtual machine ID from the memory buffer, the second virtual machine ID identifying a second instance of the virtual machine and being different from the first virtual machine ID.

2. The method of claim 1, wherein the firmware includes instructions to generate Advanced Configuration and Power Interface (ACPI) data structures.

3. The method of claim 2, wherein a ACPI data structure includes an ACPI method that when invoked causes the buffer address to be transmitted to the hypervisor, wherein transmitting the buffer address includes in response to invocation of the ACPI method by the hypervisor, transmitting, by the guest, the buffer address to the hypervisor.

4. The method of claim 1, wherein the guest includes a driver that executes the instructions.

5. The method of claim 1, wherein the buffer address is a virtual memory address that maps to a physical memory address.

6. The method of claim 1, wherein the memory buffer is dynamically allocated and located at a non-fixed memory address.

7. The method of claim 1, wherein the firmware includes second instructions to store the first virtual machine ID into the memory buffer, further comprising:

responsive to executing the second instructions, storing, by the guest, the first virtual machine ID into the memory buffer.

8. The method of claim 1, further comprising:
transmitting, by the guest, the buffer address to a host operating system.

9. The method of claim 1, wherein transmitting the buffer address to the hypervisor includes writing, by the guest, the buffer address to a non-present address in memory.

10. The method of claim 1, wherein transmitting the buffer address to the hypervisor includes invoking, by the guest, a hypercall instruction that traps into the hypervisor.

11. The method of claim 1, further comprising:
detecting, by the guest, that the virtual machine was restored in accordance with a previous instance of the virtual machine.

12. The method of claim 11, wherein the detecting includes in response to reading the second virtual machine ID, detecting, by the guest, that the virtual machine was restored in accordance with the first instance of the virtual machine.

13. A system, comprising:
a guest running on a virtual machine that is executable on a host machine,
wherein the guest receives firmware including instructions to allocate a memory buffer and allocates the memory buffer from guest memory, wherein the memory buffer is located at a buffer address in guest memory and stores a first virtual machine identifier (ID) that identifies a first instance of the virtual machine,
wherein the guest transmits the buffer address to a hypervisor and reads a second virtual machine ID from the memory buffer, wherein the second virtual machine ID identifies a second instance of the virtual machine and is different from the first virtual machine ID.

14. The system of claim 13, wherein the hypervisor updates an ID associated with the virtual machine from the first virtual machine ID to the second virtual machine ID.

15. The system of claim 13, wherein the guest includes a driver that executes the instructions.

16. The system of claim 13, wherein the firmware includes instructions to generate Advanced Configuration and Power Interface (ACPI) data structures.

17. The system of claim 16, wherein a ACPI data structure includes an ACPI method that when invoked causes the buffer address to be transmitted to the hypervisor, and the hypervisor invokes the ACPI method.

18. The system of claim 17, wherein in response to invocation of the ACPI method by the hypervisor, the guest transmits the buffer address to the hypervisor.

19. The system of claim 13, wherein in response to reading the second virtual machine ID, the guest detects that the virtual machine was restored in accordance with the first instance of the virtual machine.

20. A machine-readable medium comprising a plurality of machine-readable instructions that when executed by one or more processors is adapted to cause the one or more processors to perform a method comprising:
receiving, by a guest running on a virtual machine that is executable on a host machine, firmware including instructions to allocate a memory buffer;
allocating, by the guest, the memory buffer from guest memory, wherein the memory buffer is located at a buffer address in guest memory and stores a first virtual machine identifier (ID) that identifies a first instance of the virtual machine;
transmitting the buffer address to the hypervisor; and
reading, by the guest, a second virtual machine ID from the memory buffer, the second virtual machine ID identifying a second instance of the virtual machine and being different from the first virtual machine ID.

* * * * *